United States Patent
Mattle et al.

(10) Patent No.: US 6,325,583 B1
(45) Date of Patent: Dec. 4, 2001

(54) SCREW FOR FIXING WOODEN LATHS ON A ROOF SUBSTRUCTURE OR A WALL FOUNDATION

(75) Inventors: Paul Mattle, Widnau; Ernst Thurnherr, Diepoldsau, both of (CH)

(73) Assignee: SFS Industrie Holding AG, Heerbrugg (CH)

( * ) Notice: Subject to any disclaimer, the term of this patent is extended or adjusted under 35 U.S.C. 154(b) by 0 days.

(21) Appl. No.: 09/509,119

(22) PCT Filed: Sep. 21, 1998

(86) PCT No.: PCT/EP98/06016

§ 371 Date: Mar. 21, 2000

§ 102(e) Date: Mar. 21, 2000

(87) PCT Pub. No.: WO99/15796

PCT Pub. Date: Apr. 1, 1999

(30) Foreign Application Priority Data

Sep. 22, 1997 (DE) ................................ 197 41 734
Mar. 30, 1998 (DE) ........................... 298 05 784 U

(51) Int. Cl.⁷ .............................. F16B 25/00; F16B 35/04
(52) U.S. Cl. ..................... 411/413; 411/399; 411/387.6
(58) Field of Search .................... 411/399, 412, 411/413, 387.1–387.8

(56) References Cited

U.S. PATENT DOCUMENTS

| | | | |
|---|---|---|---|
| 2,292,557 | 8/1942 | Wilson . | |
| 4,878,793 | * 11/1989 | Hewison | ........................... 411/413 X |
| 4,959,938 | * 10/1990 | De Caro | ........................... 411/413 X |
| 5,433,570 | * 7/1995 | Koppel | ............................. 411/413 X |
| 5,816,012 | * 10/1998 | Willis | ............................... 411/412 X |
| 6,022,177 | * 2/2000 | Hofer | ................................ 411/399 X |

FOREIGN PATENT DOCUMENTS

| | | |
|---|---|---|
| G 27 13 879.4 | 1/1933 | (DE) . |
| 706759 | 6/1941 | (DE) . |
| G 88 04 654.0 | 9/1988 | (DE) . |
| 37 40 460 A1 | 6/1989 | (DE) . |
| G 91 05 683.7 | 9/1991 | (DE) . |
| 2967 07 265 U1 | 8/1997 | (DE) . |
| 0528450 A2 | 2/1983 | (EP) . |
| 0129404 A1 | 12/1984 | (EP) . |
| 0319812 A1 | 6/1989 | (EP) . |
| 0448915 A1 | 10/1991 | (EP) . |
| 2251 666A | 10/1991 | (GB) . |
| 2130327A | 5/1994 | (GB) . |
| 7-151123 | 6/1995 | (JP) . |
| WO 91/03609 | 3/1991 | (WO) . |

OTHER PUBLICATIONS

"Risk of Avalanche" Spellbound by screws, Von Ekkehard Fritz, pp. 22–24, 26, 28–29.
ICS Handbuch, Automatische Schraubmontage, Dipl.–Ing. Paul Schmitz, pp. 112–114.
Gebrauchsmusteranmeldung, Anwaltsakte Nr. 4107, pp. 2–7.

* cited by examiner

*Primary Examiner*—Neill Wilson
(74) *Attorney, Agent, or Firm*—Volpe and Koenig P.C.

(57) ABSTRACT

In a screw (1) for fastening wooden laths (10) to a roof substructure provided with wooden beams (9) among other alternatives, one threaded portion (2, 3) each adjoining the head (5) of the screw and adjoining a penetrating or boring point (6) is provided, these two threaded portions (2, 3) having the same major diameter. A thread-free shank portion (4) is provided between the two threaded portions (2, 3).

13 Claims, 3 Drawing Sheets

SCREW FOR FIXING WOODEN LATHS ON A ROOF SUBSTRUCTURE OR A WALL FOUNDATION

BACKGROUND OF THE INVENTION

1. Field of the Invention

2. Description of the Related Art

The invention relates to a screw with a shank provided at least partly with a thread, a boring and/or penetrating point and a head equipped with a tool drive for fastening wooden laths to a roof or wall substructure comprising wood among other alternatives.

Heretofore laths, especially roof laths, have normally been fastened by nails, even though tensile loading of nails in shank direction should be zero or only slight. Predrilled holes are necessary to ensure that the nailing process does not cause splitting, especially in the case of larger nails.

Precisely in the fastening of laths on which the actual roof covering or wall siding will ultimately be fastened, it is the roof or wall structure that is usually the weak point, because tensile forces developed during suction effect cannot be transmitted.

The use of screws has never been considered, because of the risk of splitting of the relatively narrow laths by the screw head as the screws are being tightened.

The object of the invention is to provide a screw of the type cited in the introduction, which screw is particularly suitable for use in fastening wooden laths to a roof or wall substructure.

BRIEF SUMMARY OF THE INVENTION

According to the invention, this is achieved in that one threaded portion each adjoining at least the boring and/or penetrating point and the head is provided on the shank of the screw, and these two threaded portions have the same major diameter but different thread pitches, and in that the outside diameter of the head is as large as or slightly larger than the major diameter of the threaded portions.

By the use of such a screw to fasten wooden laths, these can be loaded both in compression (as in the case of heavy snow loads) and in tension (as in the case of suction effect). In this way a durable composite structure is ensured both in compression and in tension. Such fastening does not involve maintaining a lath at a specified spacing from a substructure, since such laths practically always rest on similar wooden material, such as cross lathwork with panelling on rafters, or else are screwed together with the wooden beams or the like disposed thereunder, possibly with a vapor seal disposed therebetween.

Precisely in the case of such laths it is advantageous for lath and substructure to press strongly against one another, because the thread is engaged both in the substructure and in the region of the lath. Minor dimensional variations caused by humidity in the region of the lath and also in the region of the substructure can be accommodated when the lath is pressing against the substructure.

Since the outside diameter of the head is as large as or only slightly larger than the major diameter of the threaded portions, only a very small head is countersunk into the lath material, thus also preventing the splitting effect. Nevertheless, the screwed lath can be safely loaded in tension, since a threaded portion acting as a bracing thread is present underneath the screw head.

To reduce the driving torque, there can be provided a thread-free shank portion disposed between the threaded portions associated with the end regions of the shank.

An advantageous embodiment is achieved when the thread-free shank portion corresponds at least approximately to the minor diameter of the two threaded portions. Thereby the driving torque is relatively small even for long screws, since a corresponding portion of the screw can be drawn in, without particularly large frictional forces, by the threaded portion formed at the free end, whereupon the threaded portion adjacent to the tool drive can engage in the thread that already exists in the lath.

For manufacturing reasons alone it is advantageous for the two threaded portions to have at least approximately the same length. Relatively short threaded portions, which can be readily made precisely in the case of particularly long screws, are sufficient for transmission of the tensile and compressive forces.

It is further proposed that the ratio of minor diameter to major diameter of the two threaded portions be approximately 1:1.5 to 1:2, preferably 1:1.7. By virtue of this relatively deep thread, it is ensured that relatively large forces can be transmitted, because the thread flanks protrude well above the minor diameter and thus can penetrate deep into the adjoining material of the lath.

It is also expedient for the minor diameter in the region of the one threaded portion close to the head to merge into the outside diameter of the head via conical expansions. Thereby it is ensured that splitting of the laths is not initiated even during countersinking of the head. By virtue of this special transition region, the splitting risk is precluded despite the need to provide a head in which the tool drive is located.

For particularly long screws, it is advantageous for the length of the threaded portions to be constant despite different total length of the screw, and for the length of the shank portion which may be thread-free to be varied. The special length of the threaded portions adjacent to the two ends of the screw is completely sufficient for transmission of compressive and tensile forces, and so it does not have to be increased even in very long screws. Thereby the manufacture of screws having different lengths is also simplified, since the threaded portions always have the same length regardless of the screw length.

To provide even more effectively for special load cases, especially with regard to roof pitch and to roof laths laid across the roof slope, or to particular forces to be expected, it is expedient for the screws to be driven in at an acute angle to a central longitudinal plane of the laths to be fastened. In a special type of lath fastening, it is also possible for the screws driven in successively in the long direction of a lath to be inserted at an acute angle in opposing directions relative to a central longitudinal plane of the lath. Thereby there is achieved particularly effective anchoring of the lath on the substructure and, as a further benefit, the danger of tilting of the lath under large loads is also precluded.

A further option provides that the shank portion disposed between the two threaded portions associated with the end regions of the shank is equipped with a thread identical or similar to the two threaded portions or with a thread of reduced diameter. Thereby additional bracing is possible even in the region between the two threaded portions.

Another embodiment provides that the shank portion has a thread of reduced major diameter compared with the major diameter in the threaded portions, while the minor diameter is substantially equal over the length of the threaded portions and of the shank portion. In this way, therefore, a substantial reduction of the driving torque can also be achieved, since the screw does not make full surface contact over its entire length in the thread cut by the screw itself. Nevertheless, the necessary tensile and compressive forces can be transmitted.

A further advantage is achieved in that the flank angle of the threaded portions and if applicable of a thread formed on the shank portion is approximately 40° and the thread pitch is at least approximately 3 mm. The driving-in process can therefore be completed quite quickly by virtue of the large thread pitch. Because of the relatively sharply tapered thread, a cutting action takes place in the region of the roof lath, thus further reducing the risk of splitting.

A particularly advantageous embodiment provides that the diameter of the thread-free shank portion is reduced from the starting wire material to the minor diameter of the threaded portions. Especially by such reduction of the shank portion, it can be ensured that the diameter of the shank portion ultimately corresponds to the minor diameter of the threaded portions, and so full advantage can be taken of the possibilities of reducing the torque for driving in the screw.

In this connection there can also be conceived another manufacturing option which leads to about the same end result. For this purpose it is proposed that the regions of the threaded portions of the shank be thickened by upsetting to a diameter larger than that of the starting wire material before the thread is formed, so that the minor diameter of the threaded portions once again corresponds to the diameter of the thread-free shank portion after the threads have been rolled. Thus the inverse procedure is also possible, to the effect that there is created a thread-free shank portion with a diameter corresponding substantially to the minor diameter of the threaded portions.

For screws up to a certain length, it is advantageous for the length of the threaded portions and the length of the shank portion, which may be thread-free or else provided with a further thread, to correspond to about one third of the total length of the screw.

BRIEF DESCRIPTION OF THE SEVERAL VIEWS OF THE DRAWINGS

Further features and special advantages according to the invention will be explained in more detail in the description hereinafter with reference to the drawings, wherein.

DETAILED DESCRIPTION OF THE INVENTION

Figure 1:
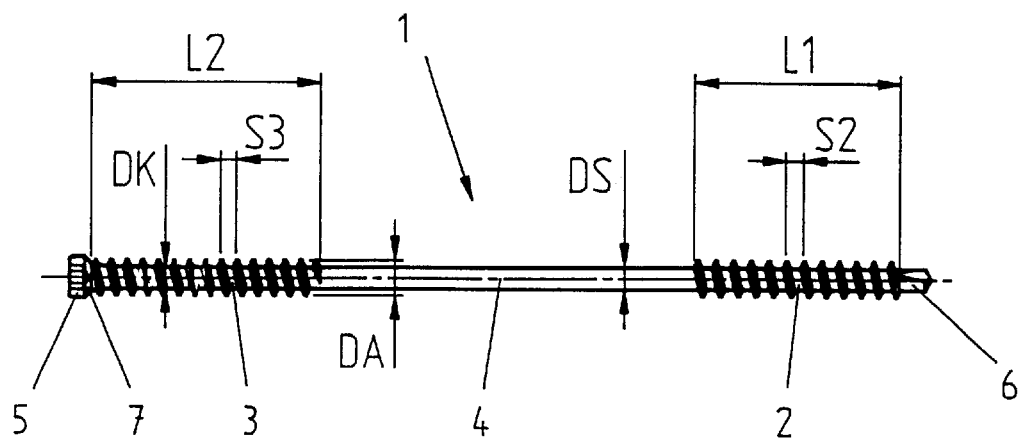
FIG. 1 shows a view of a screw according to the invention.

Screw 1 illustrated in FIG. 1 is designed with a shank which is equipped at least partly with a thread and which is provided with a boring point 6 and equipped with a head 5 containing a tool drive. The tool drive is advantageously designed as an internal drive, because the head will be appropriately countersunk when used as intended. Thus large tools or tools with corresponding diameter are not practical and, especially for such applications, an external drive is hardly conceivable. In the application according to FIG. 2, for example, screw 1 is used for fastening laths 10 to a roof substructure provided with wooden beams 9 among other alternatives. On these wooden beams 9 there can be attached panelling or planking 12, possibly a vapor seal and/or an insulating layer 13, and possibly additional layers of wood or of a solid insulating material.

On the shank of screw 1 there is provided a threaded portion 2 adjoining boring point 6 and a threaded portion 3 adjoining head 5. Both threaded portions 2, 3 have the same major diameter DA but different thread pitches. In the illustrated embodiment, shank portion 4 disposed between the two threaded portions 2, 3 is thread-free, this thread-free shank portion 4 having a diameter DS which corresponds approximately to the minor diameter DK of the two threaded portions 2, 3. For practical purposes, therefore, constant diameter can be achieved throughout the solid material, only the thread flights of threaded portions 2 and 3 projecting beyond this diameter DS or DK. Threaded portion 2 has a length L1 and threaded portion 3 a length L2. Advantageously both threaded portions have the same length L1 or L2. The relatively large ratio of minor diameter DK to major diameter DA of threaded portions 2, 3 has a particularly advantageous influence on the ability of the screw to work into the wooden parts. This ratio can be approximately 1:1.5 to 1:2, but is preferably 1:1.7. In a specific embodiment— albeit representing merely a special example—minor diameter DK is 4 mm and major diameter DA is 6.5 mm. For good penetration of the threaded regions into the wooden material, it is also advantageous to provide, in threaded portions 2 and 3, an appropriate flank angle, which expediently is approximately 40°. The same flank angle is also advantageously provided in a thread that may be formed additionally on shank portion 4. In such a very special design, the thread pitch is at least approximately 3 mm.

One feature is of special importance precisely for the present invention. By virtue of the different thread pitch of the two threaded portions 2 and 3, it is ensured that lath 10 is pressed against the substructure during the driving-in process. The thread of threaded portion 3 has a pitch S3 which is smaller than thread pitch S2 of threaded portion 2. The difference between the thread pitches is relatively small, however, to ensure that the appropriate pressure with which lath 10 and the entire substructure press against one another is reached only in the finally set condition. As soon as threaded portion 3 engages with lath 10 while screw 1 is being driven in, the said lath is drawn, by the amount corresponding to the total difference in thread pitch, toward the substructure, in the present case toward beam 9, and thus correspondingly pressed thereagainst.

The main advantage of using screws rather than nails in such an application is that screws are secured in axial direction in the corresponding parts, or in other words are locked both in laths 10 and in wooden beams 9. Even in the case of extreme loads due to suction effect or snow cover, therefore, it is not possible for head 5 to shift at the surface of lath 10 or for axial displacement of the lath to take place in any way along the shank of screw 1.

In the region of threaded portion 3 close to the head there is provided a conical expansion 7, which merges into the outside diameter of head 5. In this case minor diameter DK in the region of threaded portion 3 close to the head merges into an expansion of greater diameter, part of which expansion is disposed in the region of threaded portion 3. Head 5 has an outside diameter which is as large as or only slightly larger than major diameter DA of threaded portions 2 and 3, whereby the splitting effect during the process of screwing into a lath is for practical purposes nullified.

Figure 2:
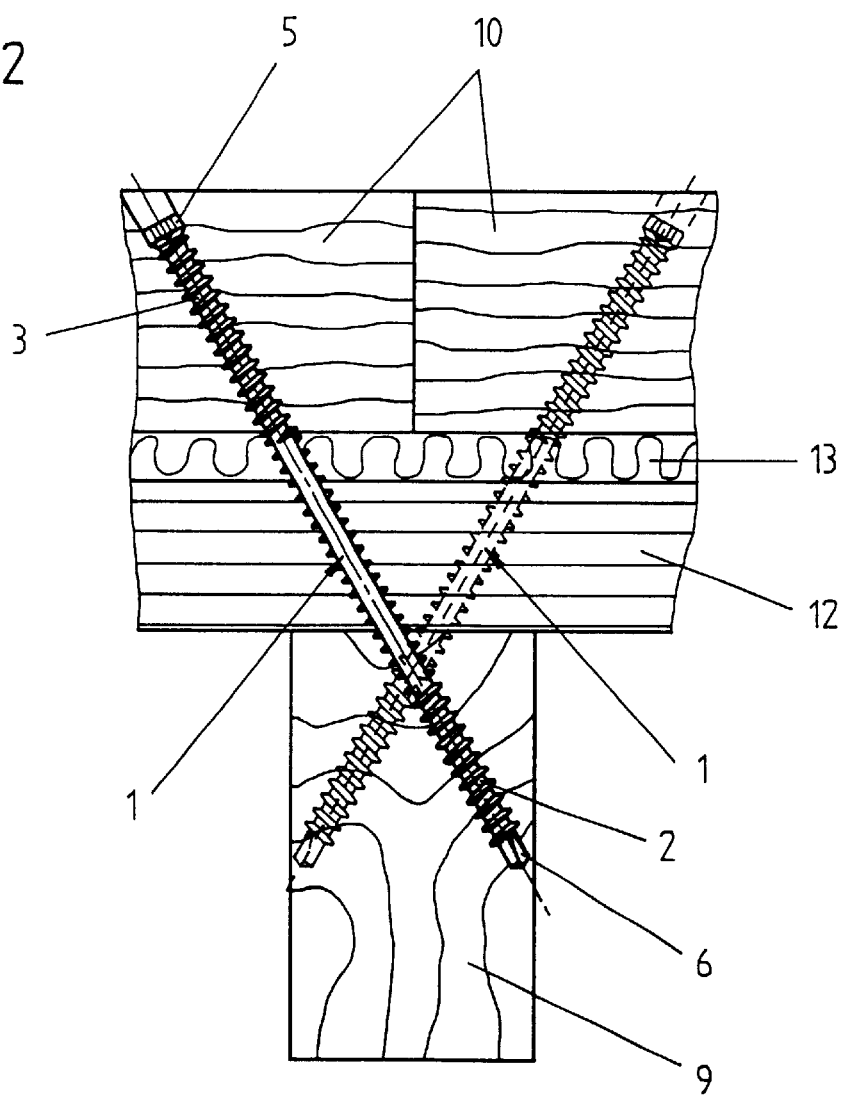
FIG. 2 shows a potential application of a screw for fastening wooden roof laths to a roof substructure provided with wooden beams among other alternatives.
Figure 3:
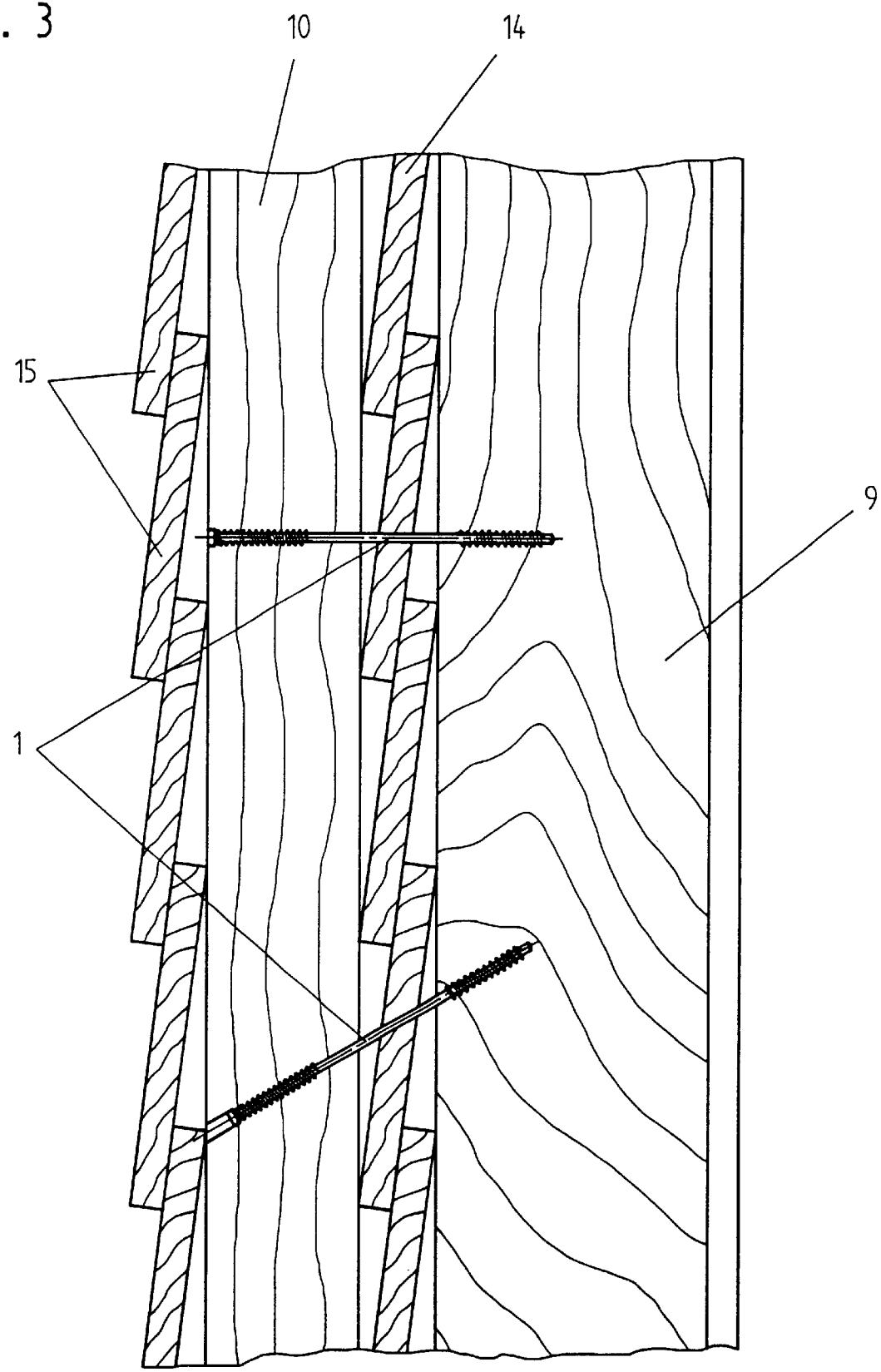
FIG. 3 shows a further potential application of a screw for fastening wooden laths to a wall substructure provided with wood among other alternatives.

In the use, up to a certain length, of screws such as shown in the practical examples of FIGS. 2 and 3, the length of threaded portion 4 is only slightly greater than length L1 or L2 of threaded portions 2 and 3, and so portions L1 and L2 as well as shank portion 4 disposed therebetween each account, for example, for one third of the total length of the screw. It is also entirely possible, however, to keep lengths L1 and L2 of threaded portions 2 and 3 constant even for different total lengths of the screw, in which case only the length of threaded portion 4 changes. Thereby it can be ensured that the torque is not substantially exaggerated even for relatively long screws and the deep penetration into the wood associated therewith.

Screws 1 can be screwed in horizontally, substantially in the longitudinal central plane of laths 10, meaning that they are oriented perpendicular relative to wooden beams 9. As illustrated in FIGS. 2 and 3, however, it is also possible to drive in screws 1 at an acute angle to this imaginary longitudinal central plane, or horizontally in this longitudinal central plane, but inclined at an acute angle to the top side of lath 10. It is also conceivable that screws 1 driven in successively can be inclined at an acute angle in opposing directions relative to such a longitudinal central plane of lath 10.

FIG. 2 shows a special case in which such an application can be achieved particularly advantageously with the screw according to the invention. Therein two laths 10 abutting one another at their ends are fastened to one wooden beam 9. In this case the ends of laths 10 can be joined securely to wooden beam 9 by screws 1 driven in obliquely. Splitting of laths 10 can be avoided because the screws are driven in obliquely and because of their special design, including the structure of the thread and including the structure of the screw head.

FIG. 3 shows a further practical example. Siding elements 14 are attached to a substructure, which can also be formed from wooden beams 9. If a facade provided with siding elements 14 is now to be renovated, laths 10 can be fastened by means of screws 1 according to the invention to underlying wooden beam 9, without having to remove already present siding elements 14. By virtue of mounted laths 10, new siding elements 15 can be fixed to laths 10. Precisely in such an application it is again particularly advantageous for lath 10 to be pressed to some extent against the substructure together with old siding elements 14.

As is evident from the practical examples according to FIGS. 4 to 7, screw 1 is also used for fastening roof laths 10 to a roof substructure provided with wooden beams 9 among other alternatives. On these wooden beams 9 there can be attached panelling or planking 12, possibly a vapor seal 13 and an additional layer 11 of wood or else of a solid insulating material. For good penetration of the threaded regions into the wooden material, it is advantageous to provide in threaded portions 2 and 3 an appropriate flank angle, expediently of approximately 40°. In this case it is also advantageous to provide the same flank angle in a thread formed on shank portion 4. In such a very special design the thread pitch is at least approximately 3 mm. In the case of a screw of the type used here, various actions must already be taken during manufacture in order somehow to ensure that diameter DS of shank portion 4 is approximately equal to minor diameter DK of threaded portions 2 and 3. In one option, thread-free shank portion 4 is reduced from the starting wire material to minor diameter DK or threaded portions 2 and 3. The other alternative provides the inverse procedure. Thus it is also possible, before the thread is formed, to thicken, by upsetting, those regions of the shank which will ultimately comprise threaded portions 2 and 3 to a diameter larger than that of the starting wire material. Thereafter the thread will be rolled on these portions in order to obtain threaded portions 2 and 3. In this case there is achieved a minor diameter DK which again corresponds to the diameter of thread-free shank portion 4.

In the use, up to a certain length, of screws such as shown in the practical examples of FIGS. 4 to 7, lengths L1 and L2 of threaded portions 2 and 3 respectively and the length of shank portion 4 can all have about the same size, so that portions L1 and L2 and shank portion 4 disposed therebetween each account for one third of the total length of the screw. It is also entirely possible, however, for lengths L1 and L2 of threaded portions 2 and 3 to be constant for different total lengths of the screw, and so only the length of shank portion 4 changes. Thereby it can be ensured that the torque is not substantially exaggerated even for relatively long screws and the deep penetration into the wood associated therewith.

Figure 4:
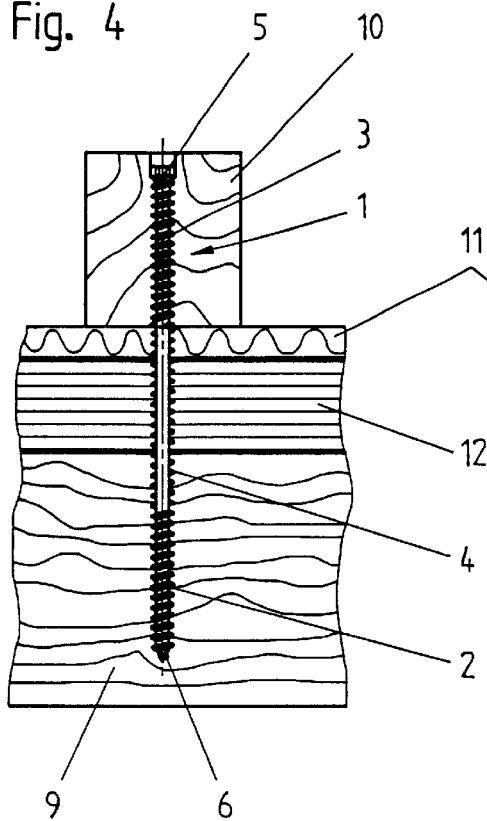
FIGS. 4 to 7 show various further potential applications of a screw for fastening wooden roof laths to a roof substructure provided with wooden beams among other alternatives.
Figure 5:
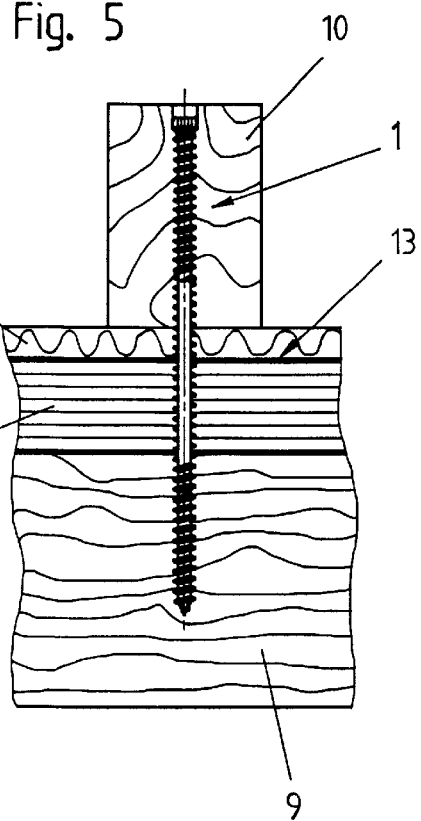
Figure 6:
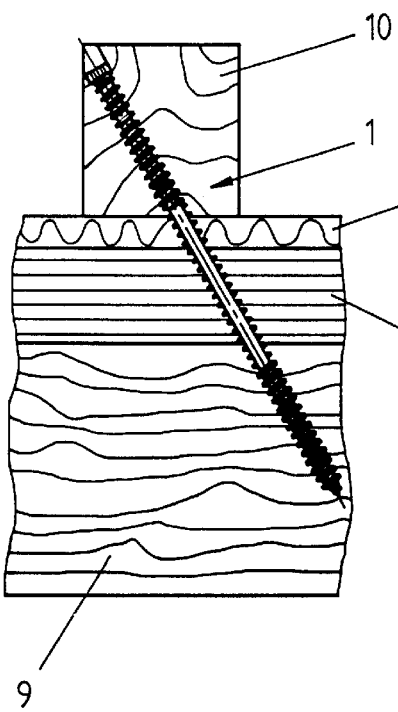
Figure 7:
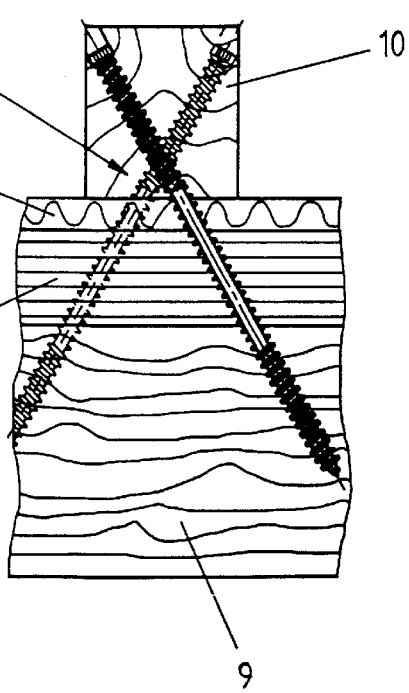

In the practical examples according to FIGS. 4 and 5, screws 1 are screwed in horizontally substantially in the longitudinal central plane of roof laths 10, meaning that they are aligned perpendicular to wooden beams 9. It is also possible, however, to drive in screws 1 at an acute angle to this imaginary central longitudinal plane of roof laths 10 and, in fact invariably only with the inclination illustrated in FIG. 6, or in other words counter to the roof slope. As can be inferred from the practical example in FIG. 7, it is also conceivable that screws 1 driven in successively can be inclined at an acute angle in opposing directions relative to such a central longitudinal plane of roof lath 10.

In the foregoing description it is assumed that shank portion 4 is thread-free. It is also conceivable, however, to provide, in addition to threaded portions 2 and 3, an appropriate thread in the region of shank portion 4 as well, so that a continuous thread is present over the entire shank of screw 1. The use of such a screw design is practical where, for the mere reason of the type of wood being used, no risk exists that the screw will be stripped while being set. In any case, the torque for driving in the screws is substantially increased with such a design.

A special embodiment in which a continuous thread is indeed present but the torque is not increased disproportionately is possible when there is provided on shank portion 4 a thread which is reduced relative to major diameter DA in threaded portions 2 and 3, thus having smaller major diameter. Naturally the thread itself is also smaller in cross section in this case, since despite the reduced thread major diameter a flank angle of approximately 40° can be retained. Thus the thread in the region of shank portion 4 is hardly engaged, and so the thread in this shank portion 4 also does not cause any higher torque loads during setting of the screws. An important feature in this case, however, is that a continuously constant thread pitch is nevertheless present.

A tool drive in the form of an internal drive is provided in screw 1 according to the invention. Naturally several options for a tool drive are available in this case, depending on the form of head 5 of screw 1.

Within the scope of the invention, it is also possible to provide, on shank portion 4, a thread extending only over part of the length thereof, an appropriately reduced thread or else threaded regions or reduced threaded regions of this nature spaced apart from one another. It would also be conceivable to provide grooves or notches in the region of shank portion 4, such machining ultimately permitting a reduction of the diameter of shank portion 4 to be achieved.

In all alternative embodiments of screws 1 there is mentioned a boring point 6, by which the wood fibers are at least partly severed while the screw is being driven in, thus preventing the risk of splitting particularly effectively precisely when the screw is being set on a lath. Naturally, however, it is also possible—as is also evident from the examples according to FIGS. 4 to 7—to provide a penetrating point at this location.

With a screw according to the invention, not only can wooden laths be fastened to a substructure, but in principle laths, plates, wall elements and roof elements can be fastened to a foundation, wherein both the superstructure and the substructure can be made of wood, wooden materials or wood-like materials.

What is claimed is:

1. A screw with a shank provided at least partly with a thread, a boring and/or penetrating point and a head equipped with a tool drive for fastening wooden laths to a roof or wall substructure comprising wood among other alternatives, characterized in that one threaded portion (2, 3) each adjoining at least the boring and/or penetrating point (6) and the head (5) is provided on the shank of the screw (1), and these two threaded portions (2, 3) have the same major diameter (DA) but different thread pitches, in that the outside diameter of the head (5) is as large as or slightly larger than the major diameter (DA) of the threaded portions (2, 3), in that a shank portion (4) disposed between the two threaded portions (2, 3) associated with the end regions of the shank is thread-free and in that the thread-free shank portion (4) diameter corresponds at least approximately to the minor diameter (DK) of the two threaded portions (2, 3).

2. A screw according to claim 1, characterized in that the two threaded portions (2, 3) have at least approximately the same length (L1, L2).

3. A screw according to claim 1, characterized in that the ratio of the minor diameter (DK) to the major diameter (DA) of the two threaded portions (2, 3) is approximately 1:1.5 to 1:2, preferably 1:1.7.

4. A screw according to claim 1, characterized in that the minor diameter (DK) in the region of the one threaded portion (3) close to the head merges into the outside diameter of the head (5) via conical expansions (7, 8).

5. A plurality of screws according to claim 1, characterized in that the length (L1, L2) of the threaded portions (2, 3) is constant despite different total lengths of the different screws (1), and in that the length of the shank portion (4) which may be thread-free differs for different ones of said screws (1).

6. A plurality of screws according to claim 1, characterized in that the screws (1) are driven in at an acute angle to a central longitudinal plane of the laths (10) to be fastened.

7. A plurality of screws according to claim 6, characterized in that the screws (1) driven in successively in the long direction of a lath (10) are inserted at an acute angle in opposing directions relative to a central longitudinal plane of the laths (10) to be fastened.

8. A screw according to claim 1, characterized in that the shank portion (4) disposed between the two threaded portions (2, 3) associated with the end regions of the shank is equipped with a thread which is substantially identical to the thread of the two threaded portions (2, 3) or with a thread of lesser diameter.

9. A screw according to claim 8, characterized in that the shank portion (4) has a thread of reduced major diameter compared with the major diameter (DA) in the threaded portions (2, 3), while the minor diameter (DK) is substantially equal over the length of the threaded portions (2, 3) and of the shank portion (4).

10. A screw according to claim 1, characterized in that the flank angle of the threaded portions (2, 3) and if applicable of a thread formed on the shank portion (4) is approximately 40° and the thread pitch is at least approximately 3 mm.

11. A screw according to claim 1, characterized in that the length of the threaded portions (2, 3) and the length of the shank portion (4), which may be thread-free or else provided with a further thread, correspond to about one third of the total length of the screw (1).

12. The screw of claim 1, which is driven into the wooden laths and the substructure so that the laths are pressed against the substructure.

13. The screw of claim 1, characterized in that the threaded portions (2, 3) have threads without recesses.

* * * * *